United States Patent [19]
Auerbach

[11] 3,944,437
[45] Mar. 16, 1976

[54] EXPLOSION PROOF VENTING DEVICE FOR ELECTRICAL STORAGE BATTERIES

[76] Inventor: Joab Auerbach, 18a MacDonald St., Ramat Gan, Israel

[22] Filed: Sept. 16, 1974

[21] Appl. No.: 506,745

[52] U.S. Cl. ............................................. 136/179
[51] Int. Cl.² ........................................ H01M 2/12
[58] Field of Search ........................... 136/177, 179

[56] References Cited
UNITED STATES PATENTS

| | | | |
|---|---|---|---|
| 2,298,938 | 10/1942 | Griffin et al. ....................... | 136/179 |
| 2,471,585 | 5/1949 | Rittenhouse et al. ............... | 136/179 |
| 2,610,221 | 9/1952 | Keller ................................. | 136/177 |
| 2,988,589 | 6/1961 | Osborn .............................. | 136/179 |
| 3,630,788 | 12/1971 | Hennen.............................. | 136/179 |

*Primary Examiner*—Donald L. Walton

[57] ABSTRACT

An explosion proof venting device for electrical storage batteries comprises a multi chamber plastic receptacle which may contain catalytic material or a gas drying filter, or both of them, a disc shaped porous flame barrier, having a central aperture, a hollow plunger which serves also as a filling funnel, and which may also contain an indicator device, and a cover shielding the flame barrier as well as the funnel.

14 Claims, 3 Drawing Figures

EXPLOSION PROOF VENTING DEVICE FOR ELECTRICAL STORAGE BATTERIES

THE FIELD OF THE INVENTION

The present invention relates to an explosion proof venting device for electrical storage batteries. The invention is particularly adapted for use in connection with stationary, industrial type of lead acid storage batteries, and is therefore described with respect to that application.

BACKGROUND OF THE INVENTION

During the operation of lead acid storage batteries, especially during the final stages of the charging operation, hydrogen and oxygen are freed which are usually vented to the atmosphere by means of a venting device provided on top of the battery casing. Unless such device is equipped with a reliable flame barrier the escaping gases constitute an imminent explosion hazard whenever an open flame, or a spark comes into contact with these gases. Furthermore, the said gases usually carry with them a certain quantity of acid thus making them corrosive.

Hitherto protection against explosion was mainly provided by one of the following means:

a. a bell shaped body of porous material covering the vent hole completely, and which therefore had to be removed for maintenance operations, leaving the hole unprotected during such operations b. an open filling funnel whose bottom aperture is always below the electrolyte level. This funnel is surrounded by a large bushing made of porous material. The gases enter the space between the funnel and the inside of the bushing and are free to diffuse through its body to the atmosphere.

In both cases the porous material acts as a flame barrier. The drawbacks of these arrangements are that the porous material, being usually slightly moist, is likely to become covered with a layer of dust thus clogging the pores. Dust and foreign matter might also enter the open funnel.

OBJECT OF INVENTION

It is the object of the present invention to provide improvements in such venting devices making them secure to a maximal degree and removing the above drawbacks present in conventional venting means.

SUMMARY OF INVENTION

According to the present invention the various parts of the venting device are assembled in such a manner as to form a number of chambers which are interconnected by means of relatively large apertures.

The last chamber (in the sense of direction of travel of escaping gases) may contain either a catalytic material, or a neutral filtering material, or both of them.

Acid fumes passing through this device will be made to shed their liquid contents before reaching the atmosphere by means of bringing them into contact with relatively large surfaces of the device, and also by changing the direction of gas flow several times.

On top of the above last chamber, underneath a perforated plastic insert forming the top of the device, and gas tightly bonded to it, is positioned a flat discshaped flame barrier made of a relatively thin, porous, acid resisting material or of a suitable wire gauze. Erupting cavities, i.e. "breathing spaces" are provided on both sides of the barrier thus ensuring free gas passage at all times.

According to one embodiment of the invention the new venting device also comprises a tube-like sleeve in which is fitted a hollow plunger whose bottom is completely immersed in the electrolyte at all times, just above the separators of the battery while the inside of its top end is funnel shaped. Molded to the outside of the plunger, are a number of discs and vanes to guide the escaping gases as required. The plunger may be bonded to the inside of the surrounding sleeve. Maintenance operations can be carried out through this plunger assembly in the usual manner.

According to a further feature of the invention, the plunger may be moveable inside the above sleeve. In this case, the plunger will be provided with an O-ring to ensure gas tightness. The upward movement of the plunger can be adjusted so as to respond to a predetermined pressure inside the cell. Thus it can also serve as a safety release valve.

At the bottom end of the plunger, shielded holes are provided to establish communication between the interior of the plunger and the outside, thus ensuring free passage of liquids. Additional holes are provided about 15 mm above the lower holes to improve electrolyte circulation inside the plunger.

Incidentally, the plunger may also be utilized as the carrier of an indicator device inserted thereinto.

A removable top cover is provided which gives complete protection to the plunger as well as to the flame barrier against dust and other foreign matter. The cover is equipped at its underside with a number of small radial ribs touching the top of the venting assembly thus ensuring clean, annular venting paths to the atmosphere.

According to another feature of the invention, the last chamber may contain a catalytic material for the recombination of the hydrogen with the oxygen to water. Excess quantities of gases are bypassed through the flame barrier. A gas drying filter may be used alternatively; or a combination of both.

SHORT DESCRIPTION OF DRAWING

The new venting device is shown in the annexed drawings,

FIG. 1 being an elevational section of the device in position on a cell.

FIG. 2 is a partly cut-away perspective view of the device, while

DETAILED DESCRIPTION OF A PREFERRED EMBODIMENT

Figure 1:
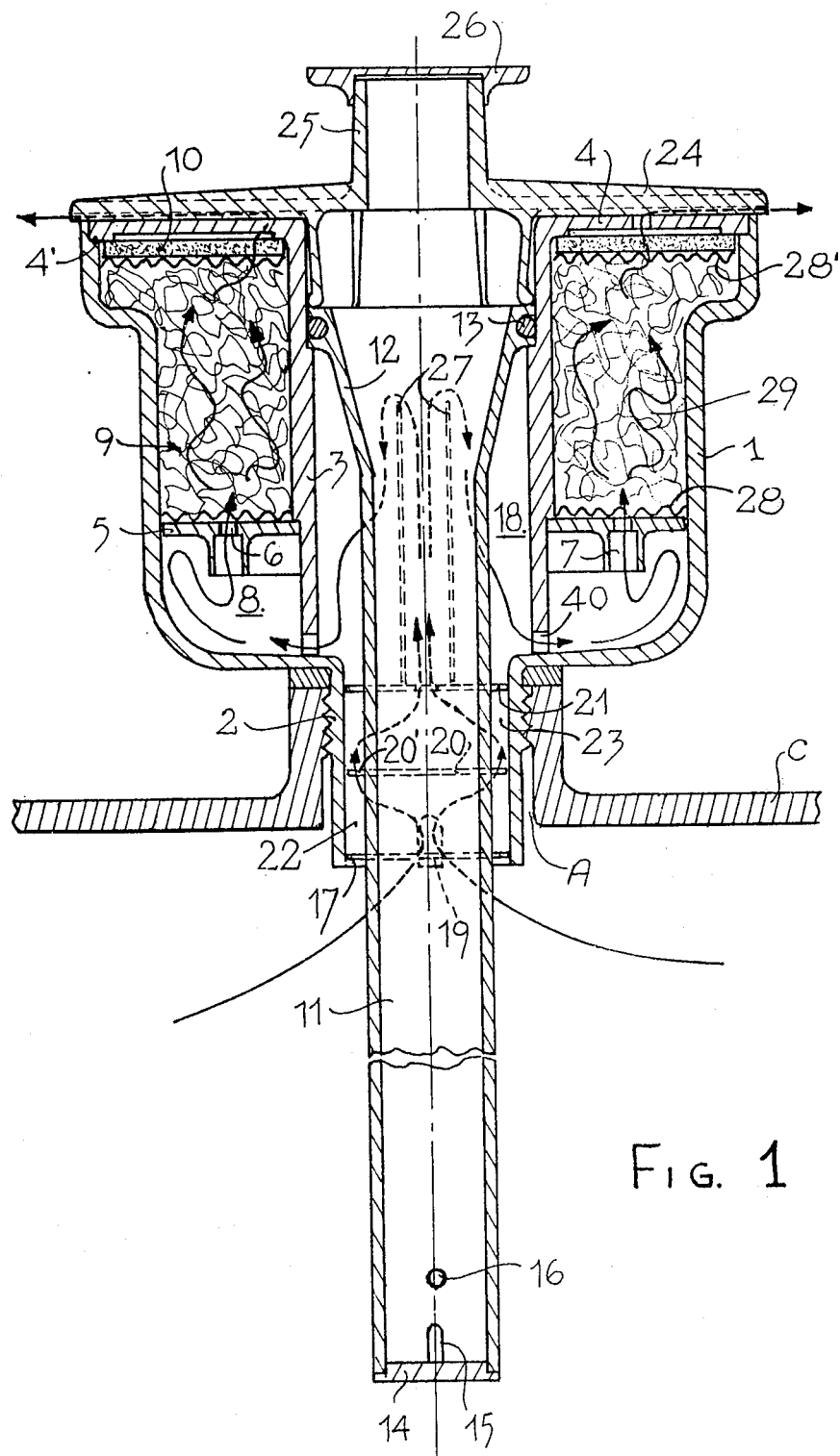

The invention will now be described with reference to the drawings:

In the cover of a battery cell C is provided a rimmed aperture A having an internal screw thread. The venting device comprises a cup shaped casing 1 which has a downwardly extending, exteriorily screw threaded neck portion 2, by means of which the device is connected to the cell by screwing portion 2 into the aperture A. Where the cell cover is differently constructed and has no screw thread in the aperture, the connecting means of the venting device are appropriately adapted, e.g. a bayonet joint may be used or any other conventional means.

Centrally disposed within the cup 1 is a sleeve 3 which is gas tightly bonded to the top of cup 1. At the lower end of sleeve 3 apertures 40 are provided in the wall of sleeve 3.

At its upper end the sleeve 3 carries a horizontal, disc shaped flange, 4, which fits into the cup shaped housing and rests on a shoulder 4' provided on the inner wall of the cup 1. Some distance above the bottom of the cup 1 is provided a horizontally extending partition 5 which is bonded to sleeve 3 and which fits into cup 1. In the partition 5 there are provided a number of circumferentially disposed holes 6 leading into a downwardly extending inverted groove 7 on the underside of the partition 5. A chamber 8 is thus created beneath the partition 5. A further chamber 9 extends above the partition 5. On top of chamber 9 and protected by flange 4 — and sealing it against the open — lies a flame barrier 10 made of porous material or fine mesh gauze. The flame barrier is an annular, centrally pierced flat plate and is gas tightly bonded to the underside of flange 4.

Figure 2:
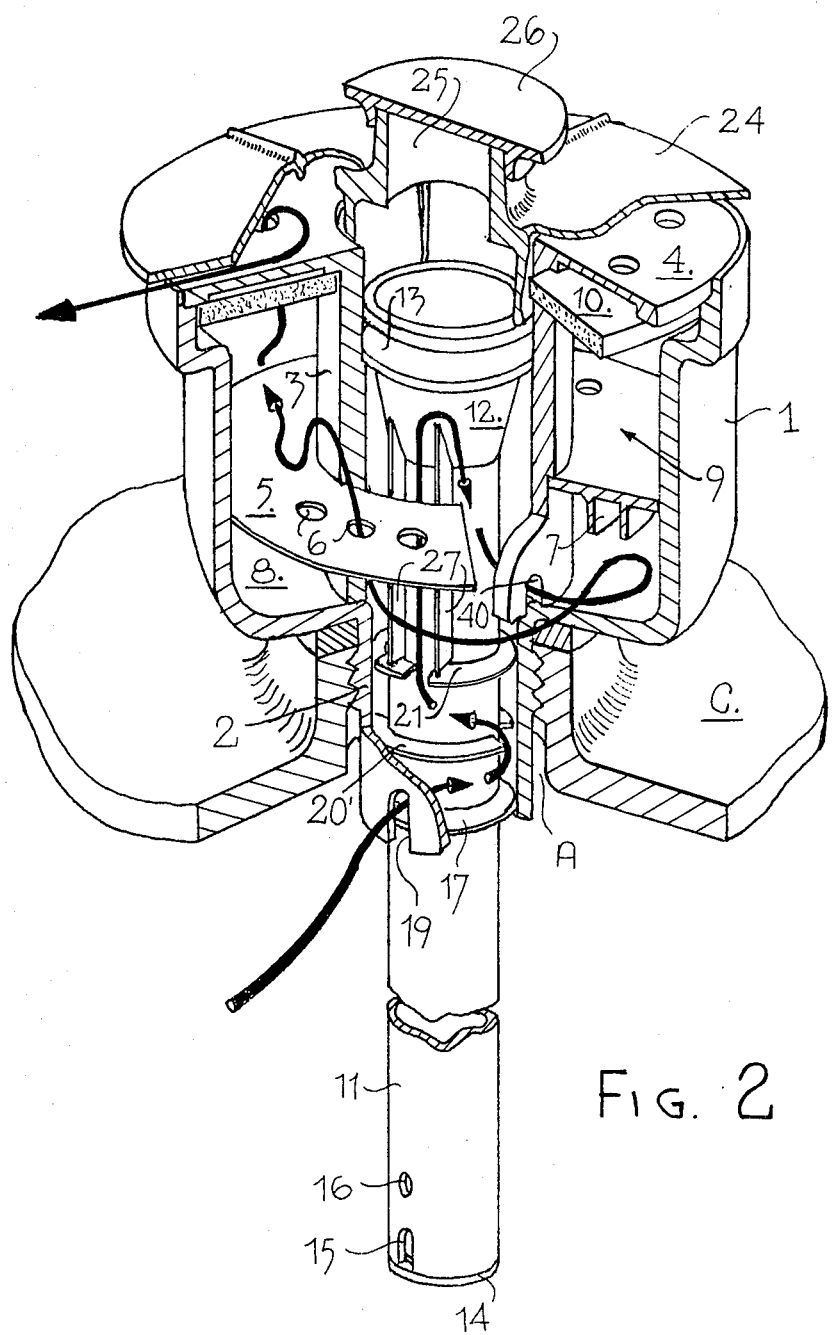
Figure 3:
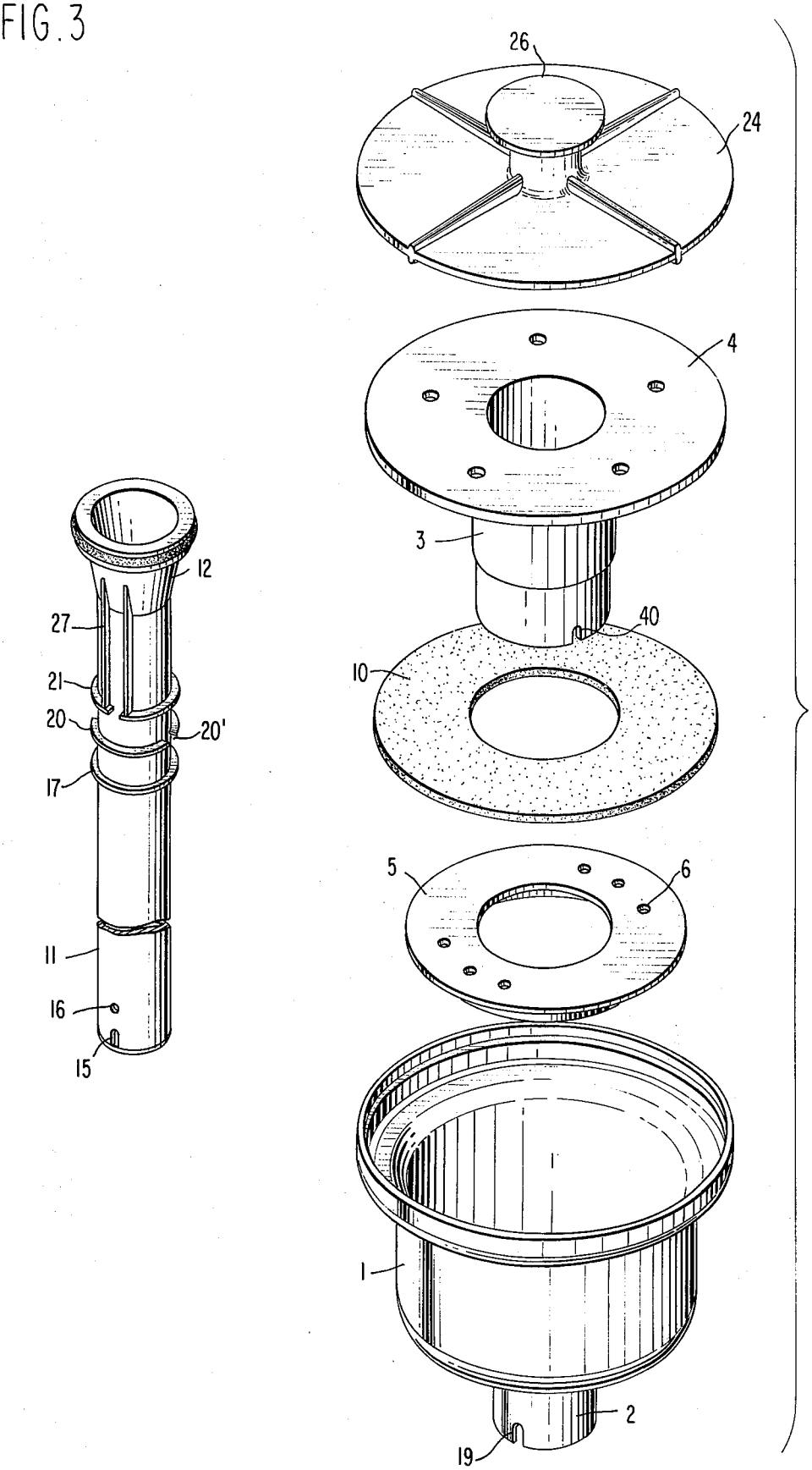
FIG. 3 is an exploded view of the assembly of parts consisting the new device.

In the sleeve 3 is inserted a hollow plunger 11, the upper end of which flares outwardly, so constituting a funnel shaped intake 12. The plunger 11 may either be bonded to the sleeve 3 at its uppermost, widest portion 12, or may be held therein frictionally with the interposition of an O-ring 13. The bottom of the hollow plunger is closed by a disc 14. Above the said closed bottom are provided one or more slots 15 and some distance above each slot 15 there is an aperture 16. As can be seen in FIGS. 1 and 2, the plunger 11, while extending co-axially with sleeve 3 and cup 1 is distanced from both of these. Thus, where the plunger 11 passes out downwardly from the neck portion 2 of cup 1, the annular space around the plunger 11 is sealed by a spray arrester disc 17.

At the level of the spray arrester 17 there are provided in the neck portion of 2 of the outer cup shaped casing 1 two oppositely disposed apertures 19.

The hollow plunger 11 extending within the sleeve 3 and downwardly out of it is provided with outwardly extending horizontal discs: a first one marked 20, some distance above the spray arrester 17. This disc has two oppositely disposed cutouts 20', A second, like disc 21 extends some distance above the said first named one. It also has two oppositely disposed cutouts 21' which are set off by 90° against the cutouts 20'. Thus, between the spray arrester 17 and the disc 20 a chamber 22 is formed and between disc 20 and disc 21 a further chamber 23 is formed. Both these chambers are ring shaped and lie around the outer wall of the hollow plunger 11. Above disc 21 extends a space forming a chamber 18 around the wall of the plunger 11. In this space extend vertical vanes 27 which form chimney like conduits in register with the cutouts 21'. From chamber 18 openings 40 — at the bottom of sleeve 3 — as already stated — lead into the chamber 8.

A lid 24 rests on top of cup 1. The lid has an upwardly extending tubular projection 25 which in turn is covered by a removable cover 26.

The chamber 9 may be filled with a catalytic or filtering material 29 which is confined between perforated, corrugated PVC washers 28 and 28'.

The cover 24 is provided at its underside with a number of radial ribs of approximately 1 mm thickness. These ribs rest on flange 4, between them thus come into existence sector shaped passages to the open.

It will be seen that while all chambers 22, 23, the passage between vanes 27, chamber 18, chamber 8 and chamber 9 intercommunicate, the apertures establishing communication between them are so disposed in relation to one another that the direction of flow of gases is continuously changed and reversed.

At the same time, during their travel, the gases impinge on the walls forming the chambers and are in constant contact therewith, which — as will be seen — is of great importance.

WORKING DESCRIPTION

Acid fumes rising to the top of the cell cover C will be deflected by the direct spray arrester 17 to the two entrance slots 19 leading into the annular chamber 22 formed by the arester 17 and disc 20.

Upon entering the chamber 22 the fumes impinge on the wall of the plunger 11 and then are deflected through 90° to rise into chamber 23 through the two slots 20'.

In chamber 23 the fumes are again deflected through 90° and rise through two slots 21' into the two vertical gas passages formed by vanes 27.

At the top of the gas passages the fumes are deflected through 180° downwards into the chamber 18 serving as a precipitation chamber. Here minute droplets of liquid acid carried by the gases precipitate, collecting in the chamber, to flow back into the cell.

At the bottom of chamber 18 the fumes will be deflected through 90° into chamber 8, being a gas-separation and expansion chamber, through apertures 40.

From chamber 8, the gases rise through holes in the top of the inverted groove 7 into chamber 9.

The perforated, corrugated PVC washers 28, 28' in the latter chamber act as gas distributors. Furthermore, they prevent the filtering material 29 from clogging the gas passages.

According to requirements, chamber 9 may contain sufficient catalytic material to recombine the hydrogen and the oxygen to water up to a limited rate of gas flow. Excess quantities of gases beyond the capacity of the catalyst may be by-passed to avoid overheating of the device.

Chamber 9 may alternatively contain a gas filtering material (fibreglass, plastic floss or the like) to eliminate liquid acid from the gases to a maximal extent. A combination of both these possibilities is also within the scope of the invention.

The flame barrier 10 may be made of any acid resisting, porous material with suitable physical properties e.g. sintered glass, sintered ceramics, fine wire gauze and like materials.

The total surface of the flame barrier having a suitable pore size, will permit the free flow of gases at a minimum flow resistance. "Breathing spaces" are provided on both sides of the flame barrier.

The upper breathing space is connected by a number of holes in flange 4 to the atmosphere. It should be noted that the flame barrier is shielded and protected by the flange 4 of sleeve 3. It is not subject to mechanical stresses and may be rather thin.

There are ensured free, sector shaped exit paths, sideways, for the escaping gases between the ribs on the underside of cover 24.

In the case of the plunger being inserted into the sleeve with interposition — preferably of an O-ring — the whole plunger will slide out of sleeve 3 in response to a predetermined exit gas pressure.

An indicator float (where required) might be utilized inside the hollow plunger protruding outwardly through the cover 26.

The topping up operation may be performed in the customary manner upon removal of either cover 26, or cover 24. Slots 15 will allow free passage for the liquids being added. Holes 16 will facilitate the recirculation of the electrolyte after topping up under operational conditions. Hydrometer readings can then be carried out through funnel 11.

What is claimed is:

1. An explosion proof venting device for storage batteries, comprising:
   a cup shaped body having a substantially tubular lower end for connection with a cell aperture of the storage battery;
   a centrally pierced horizontal plate connected to said cup shaped body near the top thereof;
   a ring shaped disc of acid resistant porous material, serving as a flame barrier, attached to the underside of said horizontal plate;
   a lid carried on the top end of said cup shaped body and spaced from said horizontal plate, the space between said lid and said plate having access to the atmosphere; and
   directing means for forcing gas entering the tubular lower end of said cup shaped body to pass through said disc and said plate before passing to the atmosphere.

2. An explosion proof venting device in accordance with claim 1 further including partition means connected to the interior of said cup shaped body for partitioning said interior into a plurality of chambers interconnected in such a way that continuous and repeated changes of direction of gas flow therethrough and maximal contact with surfaces at the interior of the chambers is ensured.

3. An explosion proof venting device in accordance with claim 1 further including a sleeve connected to the centrally pierced portion of said horizontal plate such that said plate forms a flange on the upper end of said sleeve, said sleeve being inserted into said cup.

4. An explosion proof venting device in accordance with claim 3 wherein said lid has a central opening, in communication with the interior of said sleeve, covered by a second, smaller lid.

5. An explosion proof venting device in accordance with claim 3 further including a hollow plunger disposed coaxially within said sleeve and radially spaced therefrom except for a gas tight connection therebetween at the upper end of said plunger.

6. An explosion proof venting device in accordance with claim 5, wherein said hollow plunger is closed at the bottom thereof by a sealing disc and wherein the lower portion of the wall of said hollow plunger has openings therein leading into the interior thereof.

7. An explosion proof venting device in accordance with claim 5, wherein said hollow plunger is provided with a first disc means at the level of the exit thereof from the tubular lower end of said cup shaped body for sealing the radial space between said hollow plunger and said tubular lower end from the interior of the cell of the battery, and wherein said tubular lower end has an opening therein above the level of said first disc means for allowing communication with the interior of the cell at a predetermined point on the circumference of said tubular lower end.

8. An explosion proof venting device in accordance with claim 7 further including a plurality of horizontally extending superposed discs connected to the exterior of said hollow plunger above the level of said first disc means, said discs forming chambers around said hollow plunger, said discs having cutouts therein, the cutouts in one disc being set off from those in adjacent discs.

9. An explosion proof venting device in accordance with claim 8 further including vertical vanes extending substantially radially from said plunger above said discs, vertical chimney-like passages being formed between pairs of vanes, the passages being in register with the cutouts in the uppermost of said discs.

10. An explosion proof venting device in accordance with claim 9 wherein said sleeve has an opening therein at the lowermost portion thereof to allow communication of the radial chamber between said sleeve and said plunger with the chamber formed between said sleeve and said cup shaped body.

11. An explosion proof venting device in accordance with claim 3, further including wall means provided between said sleeve and the inner wall of said cup shaped body for dividing the chamber formed therebetween into an upper chamber and a lower chamber, said wall means having an inverted channel connected to the underside thereof and holes therein leading to the upper chamber.

12. An explosion proof venting device in accordance with claim 11 wherein said upper chamber above said wall means is filled with filtering matter.

13. An explosion proof venting device in accordance with claim 11 wherein said upper chamber above said wall means is filled with catalyzing substance.

14. An explosion proof venting device in accordance with claim 11 further including perforated, corrugated PVC discs provided at the bottom and top of said upper chamber above said wall means.

* * * * *